US008602532B2

(12) United States Patent
Blair et al.

(10) Patent No.: US 8,602,532 B2
(45) Date of Patent: Dec. 10, 2013

(54) ELECTROWETTING MECHANISM FOR FLUID-APPLICATION DEVICE

(75) Inventors: Dustin W. Blair, San Diego, CA (US); Steven W. Steinfield, Poway, CA (US); Stephen W. Bauer, San Diego, CA (US); Dennis M. Huff, San Diego, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 215 days.

(21) Appl. No.: 13/098,451

(22) Filed: Apr. 30, 2011

(65) Prior Publication Data

US 2012/0273352 A1 Nov. 1, 2012

(51) Int. Cl.

| | |
|---|---|
| ***B41J 2/06*** | (2006.01) |
| ***B41M 1/42*** | (2006.01) |
| ***G01N 27/447*** | (2006.01) |
| ***G01N 27/453*** | (2006.01) |

(52) U.S. Cl.

USPC ............. 347/55; 347/112; 101/489; 204/450; 204/600

(58) Field of Classification Search

USPC .................... 204/450, 600; 347/55, 112, 114; 101/489

See application file for complete search history.

(56) References Cited

U.S. PATENT DOCUMENTS

| | | | | |
|---|---|---|---|---|
| 3,592,134 | A * | 7/1971 | Patterson, Jr. | 101/269 |
| 5,342,132 | A * | 8/1994 | Tanaka et al. | 400/120.18 |
| 7,422,312 | B2 | 9/2008 | Kadomatsu et al. | |
| 2006/0226013 | A1* | 10/2006 | Decre et al. | 204/601 |
| 2007/0153075 | A1 | 7/2007 | Lee | |
| 2010/0214388 | A1* | 8/2010 | Zeng et al. | 347/111 |

FOREIGN PATENT DOCUMENTS

| | | | |
|---|---|---|---|
| JP | 04238053 | A | 8/1992 |
| JP | 07040534 | A | 10/1995 |
| JP | 2003291355 | A | 10/2003 |
| JP | 2010069797 | A | 2/2010 |
| JP | 2010-247407 | A * | 11/2010 |

OTHER PUBLICATIONS

JPO computer-generated English language translation of Hanada et al. JP 2010-0247407 A downloaded Mar. 21, 2013; patent published Nov. 4, 2010.*

* cited by examiner

*Primary Examiner* — Alex Noguerola

(57) ABSTRACT

A fluid-application mechanism is to cause fluid to be applied onto media. An electrowetting mechanism is to generate an electric field to affect the fluid applied onto the media.

18 Claims, 4 Drawing Sheets

ELECTROWETTING MECHANISM FOR FLUID-APPLICATION DEVICE

BACKGROUND

An inkjet-printing device, such as an inkjet printer, is a type of fluid-ejection that forms an image on media like paper by ejecting ink onto the media. Examples of images include text, graphics, photos, and a combination thereof. In some situations, image quality is enhanced when the ink deposited onto the media is uniform in thickness and is optically flat. Optical flatness ensures that light incident to the image is reflected clearly without scattering.

DETAILED DESCRIPTION

As noted in the background section, the quality of images formed on media like paper by ejecting ink onto the media is enhanced when the ink deposited onto the media is uniform in thickness and is optically flat. However, the thickness uniformity and the optical flatness of the ink can be non-optimal. To improve these characteristics of the ink as the ink dries on the media, different techniques can be employed.

First, the ink may be heated while the ink is drying, which has been found to improve the thickness uniformity and the optical flatness of the ink. However, adding a heater to an inkjet-printing device can add unwanted cost and bulk to the device. Second, the ink may be formulated to include various surfactants that decrease ink-drying time, which has also been found to improve the thickness uniformity and the optical flatness of the ink.

However, such surfactants can be undesirable. They may decrease the usable life and reliability of the printhead or other fluid-ejection mechanism of the inkjet-printing device. The surfactants may be incompatible with the pigments of some types of inks that give the inks their color. Some surfactants are environmentally unsound in their use, disposal, and/or manufacture, and their use may be regulated or even prohibited.

Disclosed herein is an electrowetting platen for use in a fluid-ejection device that can overcome these disadvantages. A fluid-ejection mechanism can eject fluid, such as ink, onto a swath of media, like paper or a polymeric printing substrate, positioned against this platen. The platen can generate an electric field to affect the fluid that is ejected onto the media. For instance, the fluid ejected onto the media can be affected by the electric field such that its thickness uniformity and optical flatness are improved. The fluid ejected onto a given swath of media can be affected both while the swath is positioned against the platen (i.e., while the swath is currently receiving fluid from the fluid-ejection mechanism), as well as after the media has been advanced so that the swath is no longer positioned against the platen.

Figure 1A:
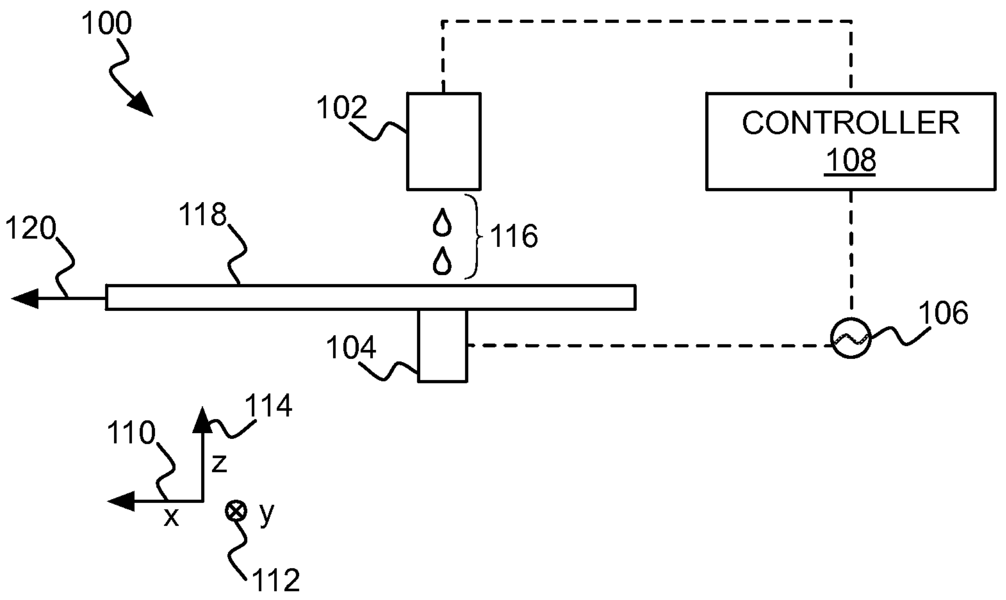
FIGS. 1A and 1B are side-view and front-view diagrams, respectively, of an example fluid-ejection device.
Figure 1B:
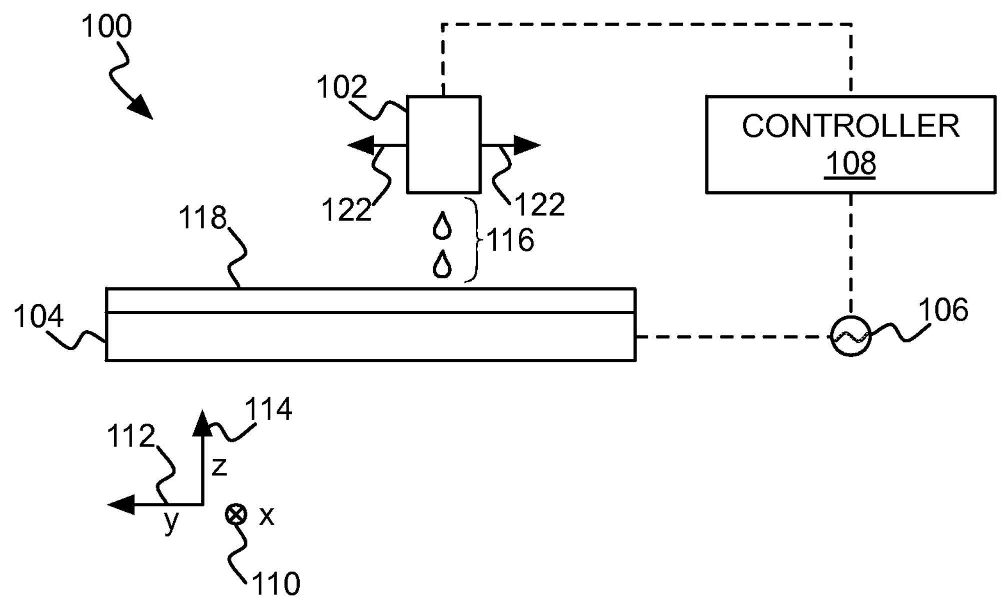

FIGS. 1A and 1B show a side view and a front view, respectively, of an example fluid-ejection device 100. The fluid-ejection device 100 can be an inkjet-printing device, such as an inkjet printer. The fluid-ejection device 100 includes at least a fluid-ejection mechanism 102, an electrowetting platen 104, a power source 106, and a controller 108. An x-axis 110, a y-axis 112, and a z-axis 114 are shown to clarify the spatial relationship between the side view of FIG. 1A and the front view of FIG. 1B.

The fluid-ejection mechanism 102 can be a printhead, such as inkjet printhead, and ejects fluid like ink, which may be an electrically conductive ink or an electrically non-conductive ink. The fluid-ejection mechanism 102 ejects fluid drops 116 onto a current portion of media 118, which may be paper, that is positioned against the electrowetting platen 104. This portion of the media 118 is referred to as a swath of the media 118.

In one example operation of the fluid-ejection device 100, the media 118 is moved in the direction indicated by the arrow 120 in FIG. 1A on a swath-by-swath basis. When a new swath is positioned against the electrowetting platen 104, the fluid-ejection mechanism 102 is moved back and/or forth over the entire swath, as indicated by the arrows 122 in FIG. 1B, and ejects fluid onto this swath of the media 118. The media 118 is then moved so that a new swath is positioned against the electrowetting platen 104 and is incident to the fluid-ejection mechanism 102, and the mechanism 102 ejects fluid onto this new swath. This process is repeated until fluid has been ejected as desired onto the media 118.

In another example operation of the fluid-ejection device 100, the width of the fluid-ejection mechanism 102 along the y-axis 112 may span the media 118 between the edges of the media 118 along the y-axis 112. In this example, the fluid-ejection mechanism 102 can be stationary, instead of having to be moved as indicated by the arrows 122 in FIG. 1B. The media 118 may be able to moved in the direction indicated by the arrow 120 without stopping while the fluid-ejection mechanism 102 ejects fluid onto the media 118.

The electrowetting platen 104 generates an electric field as the fluid-ejection mechanism 102 ejects fluid onto a swath of the media 118, to affect the fluid that is deposited onto this swath. The power source 106 provides direct current or alternating current to the electrowetting platen 104 so that the platen 104 generates a constant electric field or a varying electric field, respectively.

The controller 108, which may be implemented in software, hardware, or a combination thereof, controls the power source 106 to apply the current to the electrowetting platen 104. The controller 108 also may control movement of and ejection of fluid by the fluid-ejection mechanism 102.

The electrowetting platen 104 is a platen in that it is the component of the fluid-ejection device 100 against which a swath of the media 118 is positioned for the fluid-ejection mechanism 102 to eject fluid onto the swath. The electrowetting platen 104 is electrowetting in that it generates the electric field that affects the fluid deposited on the swath of the media 118. Electrowetting can be generally defined as the modification of the wetting behavior of a fluid on a hydrophobic surface with an applied electric field. It is noted that the electric field generated by the electrowetting platen 104 can affect the fluid deposited on the media 118 even after the current swath of media 118 has been advanced along the x-axis 110 is thus is no longer positioned against the platen 104.

The fluid-ejection device 100 is more generally a fluid-application device that applies fluid to the media 118. As such, the fluid-ejection mechanism 102 is more generally a fluid-application mechanism that applies fluid to the media 118. Examples of fluid-application devices and mechanisms include such devices and components that rely upon ejection to apply fluid to the media, such as via thermal ejection and piezoelectric ejection. Other examples include devices and components that coat the media with fluid, that roll fluid onto the media, that cause the media to be dipped into fluid, and so on.

Figure 2A:
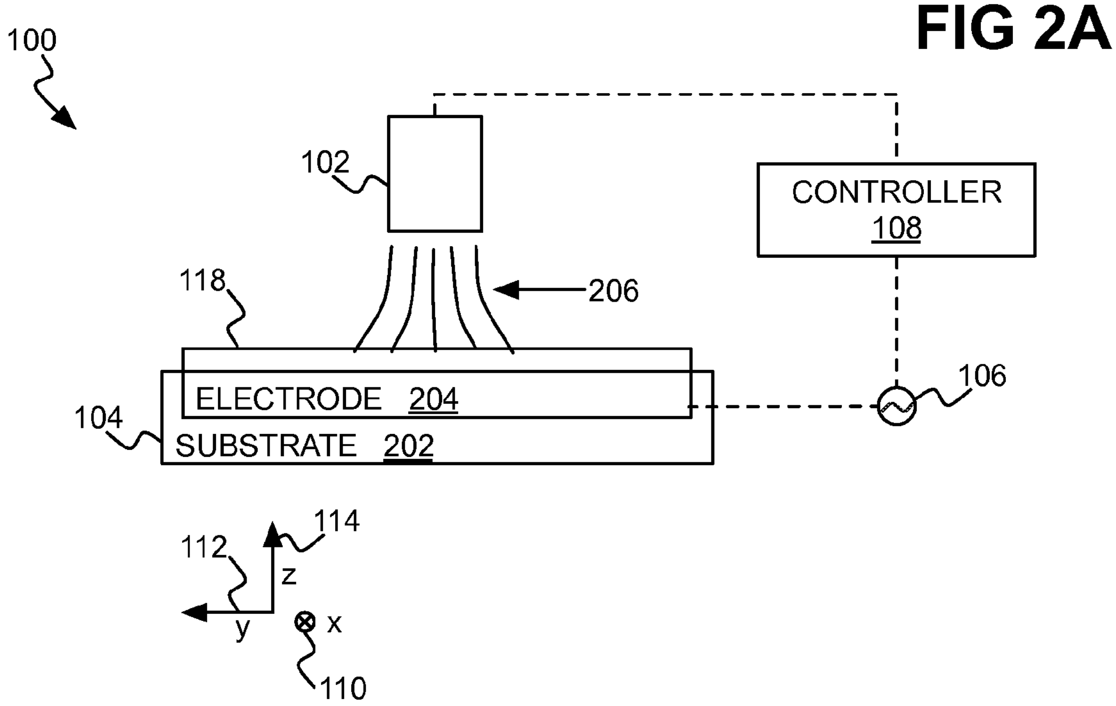
FIGS. 2A and 2B are diagrams of different examples of an electrowetting platen.
Figure 2B:
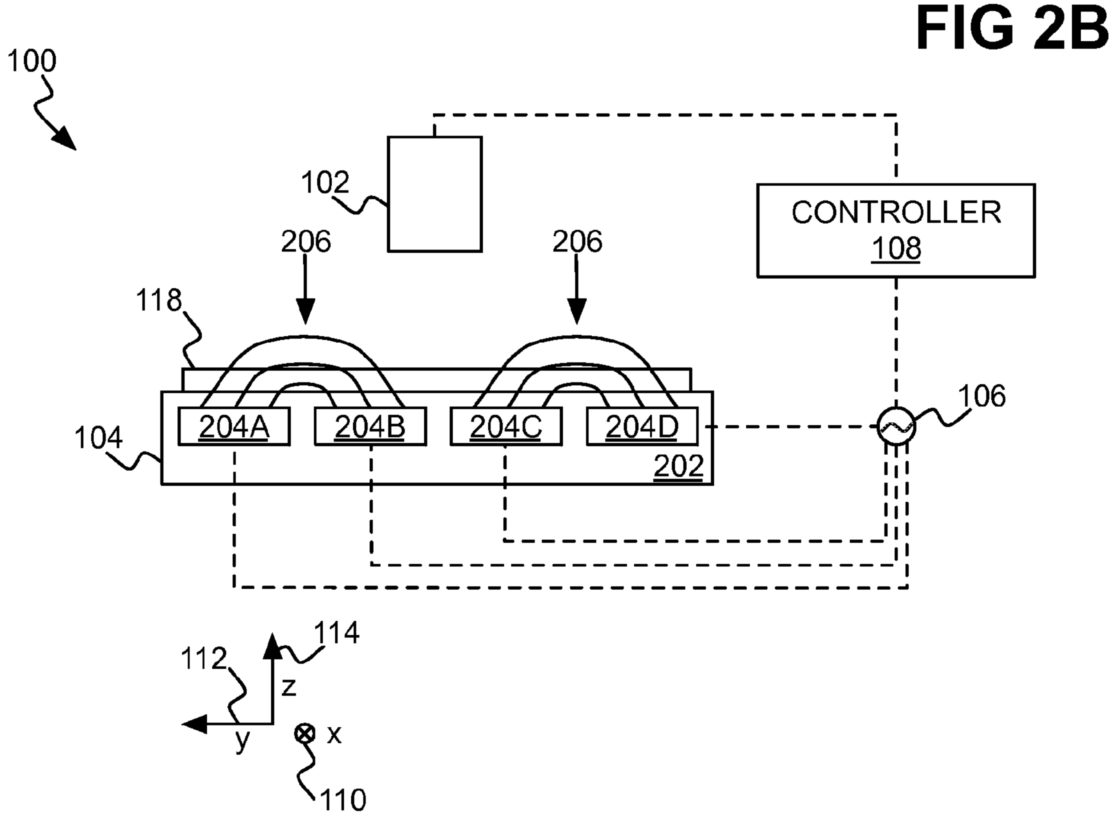

FIGS. 2A and 2B each show a front view of a different example electrowetting platen 104 of the fluid-ejection device 100. The x-, y-, and z-axes 110, 112, and 114 are depicted to clarify the spatial relationship of FIGS. 2A and 2B in comparison to FIGS. 1A and 1B. In both examples, the electrowetting platen 104 includes a substrate 202 and one or more electrodes 204.

The swath of the media 118 is positioned against at least the substrate 202 while the fluid-ejection mechanism 102 ejects fluid onto a swath of the media 118. The electrodes 204, which more generally are an electrowetting mechanism, generate an electric field 206 while the fluid-ejection mechanism 102 is ejecting fluid onto the swath. The electric field 206 affects the fluid ejected onto the swath.

In FIG. 2A, the electrode 204 is exposed through the substrate 202 such that the media 118 comes into direct physical contact with the electrode 204. In FIG. 2B, by comparison, the electrode 204 is disposed within the substrate 202 such that the media 118 is unable to come into direct physical contact with the electrode 204. The substrate 202 may be an electrical insulator. As another example, the electrode 204 may be the substrate 202; that is, the entire substrate 202 may be the electrode 204. The electrode 204 is an electrical conductor.

In FIG. 2A, the controller 108 controls the power source 106 to charge the electrode 204 negatively or positively. The electrode 204 may be the only electrode 204 in FIG. 2A. In this example, the fluid-ejection mechanism 102 has a different charge than the electrode 204, such as zero volts. Therefore, the electric field 206 is generated substantially along the z-axis 114, between the electrode 204 and the fluid-ejection mechanism 102.

In FIG. 2B, there are two pairs of electrodes 204: one pair made up of the electrodes 204A and 204B, and another pair made up of the electrodes 204C and 204D. In general, there is at least one pair of electrodes 204. The controller 108 controls the power source 106 to charge each electrode 204 of each pair of electrodes 204 differently than the other electrode 204 of each pair. For example, the electrodes 204A and 204C may be charged negatively and the electrodes 204B and 204D may be charged positively, or vice-versa. As such, the electric field 206 is generated substantially along the y-axis 112, between each pair of electrodes 204, and thus at least partially parallel to the media 118.

Figure 3:
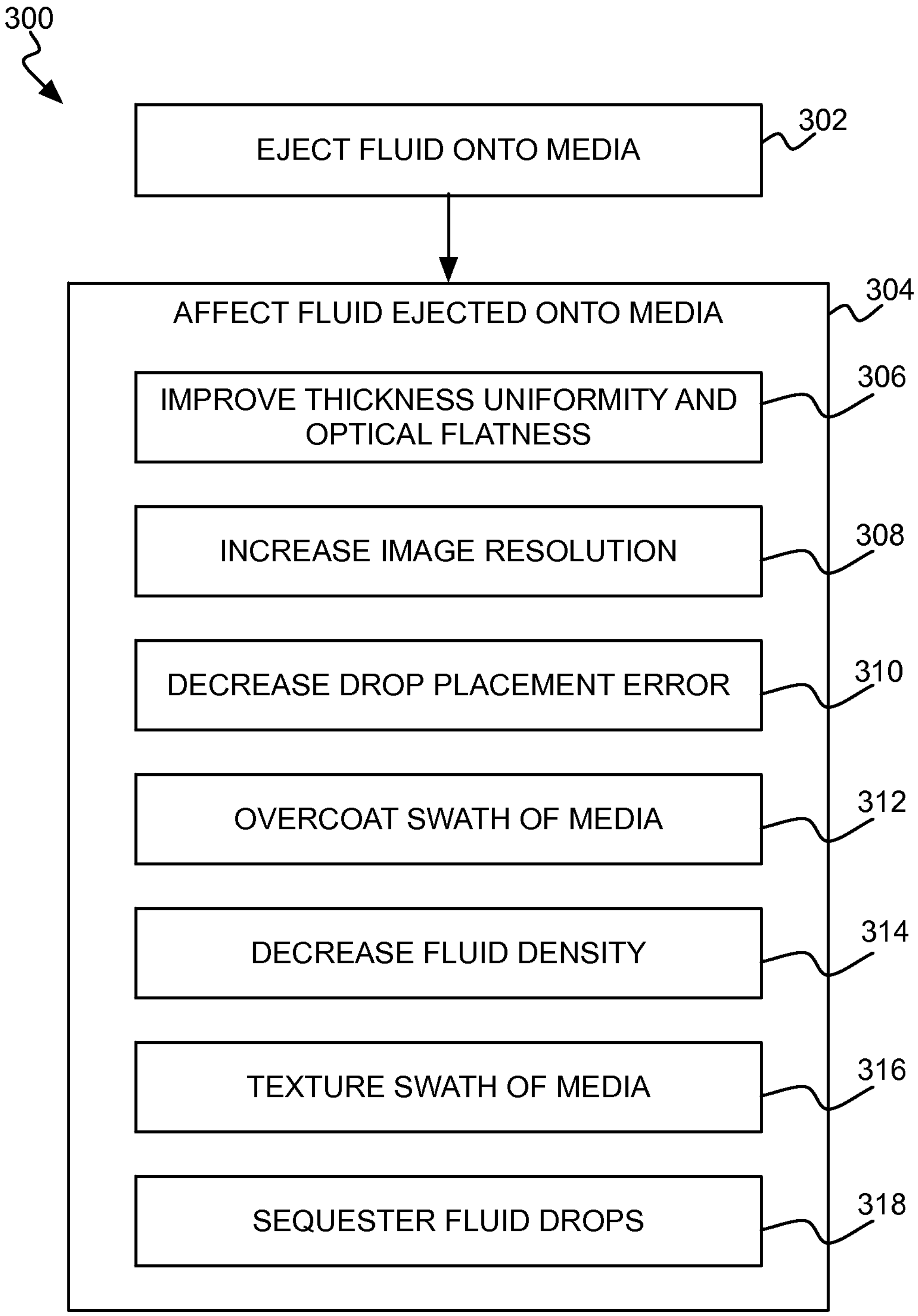
FIG. 3 is a flowchart of an example method.

FIG. 3 shows an example method 300. The fluid-ejection mechanism 102 of the fluid-ejection device 100 ejects fluid onto a swath of the media 118 positioned against the electrowetting platen 104 of the fluid-ejection device (302). The electrowetting platen 104 generates an electric field 206 while the fluid is being ejected onto the swath, to affect the fluid that is ejected onto the swath of the media 118 (304).

The fluid ejected onto the swath can be affected by the electric field 206 generated by the electrowetting platen 104 in a number of different ways. As has been noted, the thickness and optical flatness of the fluid as the fluid dries on the swath of the media 118 can be improved (306). In general, this can be achieved by the controller 108 applying a direct current to the electrodes 204 of the electrowetting platen 104 via the power source 106. As such, the electrodes 204 generate a constant electric field.

The fluid ejected onto the swath can be affected by the electric field 206 generated by the electrowetting platen 104 in other ways as well, generally by the controller 108 appropriately applying an alternating current to the electrodes 204 via the power source 106 so that the electrodes 204 generate a suitable varying electric field to achieve a desired effect. The resolution of the image formed by the fluid ejected onto the media 118 can be effectively increased by moving the drops 116 of the fluid that have been ejected onto the swath (308). Similarly, any errors in placement of the drops 116 can be corrected to at least some extent by moving the drops 116 that have been ejected onto the swath (310).

Figure 4A:
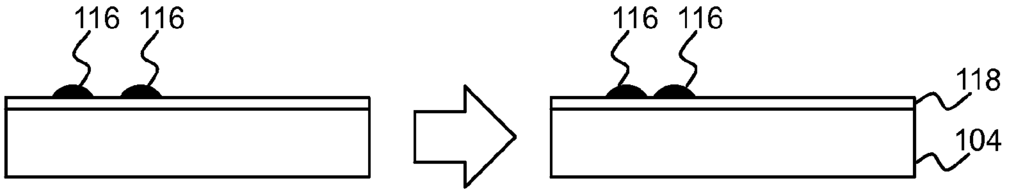
FIGS. 4A, 4B, and 4C are diagrams depicting different example applications of an electrowetting platen.

FIG. 4A shows example such movement of fluid drops 116. On the left side of FIG. 4A, two drops 116 have been ejected onto the swath of the media 118 currently positioned against the electrowetting platen 104. The right drop 116 may have been ejected too far to the right in the case of part 310 of FIG. 3, or it may have been ejected in the correct position in the case of part 308 of FIG. 3.

On the right side of FIG. 4A, either or both of the drops 116 have been moved on the swath of the media 118 due to a suitably generated varying electric field 206, by the electrowetting platen 104. In the case of part 310 of FIG. 3, just the right drop 116 may have been moved to the left, to reduce if not completely correct the placement error of this drop 116. In the case of part 308 of FIG. 3, either or both of the drops 116 may have been moved so that the drops 116 are closer together, to increase the effective resolution of the image being formed by the fluid.

Referring back to FIG. 3, the swath of the media 118 can be overcoated with the fluid that has been ejected onto the swath (312). The density of the fluid ejected onto the swath can also be decreased (314). Both of these effects can be achieved by smearing a drop 116 of the fluid that has been ejected onto the swath of the media 118.

Figure 4B:
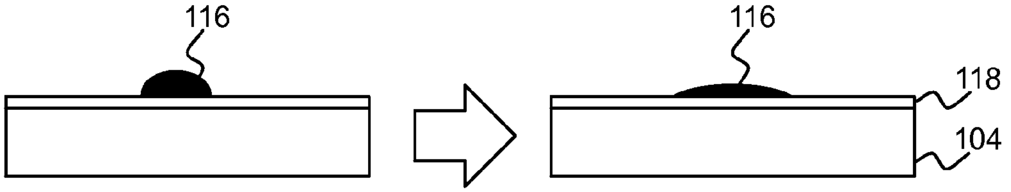

FIG. 4B shows an example such smearing of a fluid drop 116. On the left side of FIG. 4B, a drop 116 has been ejected onto the swath of the media 118 currently positioned against the electrowetting platen 104. On the right side of FIG. 4B, this drop 116 has been smeared on the swath of the media 118 due to a suitably generated varying electric field 206, by the electrowetting platen 104. In the case of part 312 of FIG. 3, this smearing can be achieved to cause the drop 116 to coat (i.e., overcoat) a larger area of the media 118. In the case of part 314 of FIG. 3, this smearing can be achieved to decrease the fluid density of the drop 116.

Referring back to FIG. 3, the swath of the media 118 can be textured with the fluid that has been ejected onto the swath (314). This is achieved by moving the drops 116 of the fluid onto one another. By comparison, the drops 116 of the fluid ejected onto the swath can instead be sequestered (316), by inhibiting movement of the drops 116 on the swath.

Figure 4C:
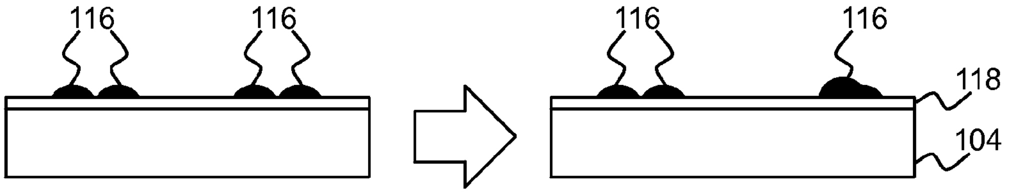

FIG. 4C shows an example of such drop movement and drop movement inhibition. On the left side of FIG. 4C, two left-most drops 116 have been ejected onto the swath of the media 118 currently positioned against the electrowetting platen 104 such that these two drops 116 are adjacent to one another. Likewise, two right-most drops 116 have been ejected onto the swath of the media 118 currently positioned against the electrowetting platen 104 such that these two drops 116 are adjacent to one another as well.

On the right side of FIG. 4C, the two left-most drops 116 do not bleed into one another, due to a suitably generated varying electric field 206, by the electrowetting platen 104. As such, the drop sequestration of part 318 of FIG. 3 is achieved. By comparison, the two right-most drops 116 have been moved so that one of these drops 116 has been moved so that it is partially on top of the other drop 116, again due to a suitably generated varying electric field, by the electrowetting platen 104. As such, the swath of media 118 has become textured to achieve part 316 of FIG. 3.

In general, then, the electrowetting achieved by the electrowetting platen 104 provides for quality improvements of the fluid ejected onto the media 118, as well as for other effects. Quality is improved, for instance, by improving thickness uniformity and optical flatness, per part 306 of FIG. 3; by increasing image resolution, per part 308 of FIG. 3; and/or by decreasing drop placement error, per part 310 of FIG. 3. Other effects can include swath overcoating, per part 312 of FIG. 3; fluid density decreasing, per part 314 of FIG. 3; media swath texturing, per part 316 of FIG. 3; and, fluid drop sequestration, per part 318 of FIG. 3. Some of these other effects may be considered as improving quality as well.

The effects that have been described in relation to parts 308, 310, 312, 314, 316, and 318 in particular can be achieved by applying different types of electric fields. For instance, electric fields that have different characteristics may result from using an alternating current as opposed to a direct current. As such, the electric fields may be varied appropriately to affect the placement of fluid drops as has been described in relation to these parts of the method 300 of FIG. 3.

As noted above, the fluid-ejection device 100 that has been described may be an inkjet-printing device, which is a device, such as a printer, that ejects ink onto media, such as paper, to form images, which can include text, on the media. The fluid-ejection device 100 is more generally a fluid-ejection, precision-dispensing device that precisely dispenses fluid, such as ink, melted wax, or polymers. The fluid-ejection device 100 may eject pigment-based ink, dye-based ink, another type of ink, or another type of fluid. Examples of other types of fluid include those having water-based or aqueous solvents, as well as those having non-water-based or non-aqueous solvents. However, any type of fluid-ejection, precision-dispensing device that dispenses a substantially liquid fluid may be used.

A fluid-ejection precision-dispensing device is therefore a drop-on-demand device in which printing, or dispensing, of the substantially liquid fluid in question is achieved by precisely printing or dispensing in accurately specified locations, with or without making a particular image on that which is being printed or dispensed on. The fluid-ejection precision-dispensing device precisely prints or dispenses a substantially liquid fluid in that the latter is not substantially or primarily composed of gases such as air. Examples of such substantially liquid fluids include inks in the case of inkjet-printing devices. Other examples of substantially liquid fluids thus include drugs, cellular products, organisms, fuel, and so on, which are not substantially or primarily composed of gases such as air and other types of gases, as can be appreciated by those of ordinary skill within the art.

We claim:

1. A platen for a fluid-application device, comprising:

a substrate against which a swath of media is positioned while fluid is applied to the swath by a fluid-application mechanism of the fluid-application device; and, an electrowetting mechanism to generate an electric field to affect the fluid that has been applied.

2. The platen of claim 1, wherein the electrowetting mechanism comprises:

an electrode configured to be charged one of negatively and positively, such that the electrical field is generated between the fluid-application mechanism and the electrode.

3. The platen of claim 2, wherein the electrode is an only electrode of the electrowetting mechanism.

4. The platen of claim 1, wherein the electrowetting mechanism comprises:

a pair of electrodes including a first electrode configured to be charged negatively and a second electrode configured to be charged positively, such that the electric field is generated between the pair of electrodes.

5. The platen of claim 1, wherein the electrowetting mechanism comprises:

a plurality of pairs of electrodes, each pair of electrodes including a first electrode configured to be charged negatively and a second electrode to be charged positively, such that the electric field is generated between each pair of electrodes.

6. The platen of claim 1, wherein the substrate is an electrical insulator, and wherein the electrowetting mechanism is disposed within the substrate such that the swath of the media is unable to come into direct physical contact with the electrowetting mechanism.

7. The platen of claim 1, wherein the electrowetting mechanism is the substrate or is exposed through the substrate, such that the swath of the media comes into direct physical contact with the electrowetting mechanism.

8. The platen of claim 1, wherein the electric field generated by the electrowetting mechanism is to affect the fluid that has been applied both while the swath is positioned against the substrate and after the swath is positioned against the substrate.

9. A fluid-application device comprising:

a fluid-application mechanism to cause fluid to be applied onto media; and, an electrowetting mechanism to generate an electric field to affect the fluid applied onto the media, wherein the fluid-application mechanism is to eject ink onto the swath of the media, such that the fluid-application device is an inkjet-printing device.

10. The fluid-application device of claim 9, further comprising a controller to apply a constant direct current to the electrowetting mechanism, such that the electrowetting mechanism is to generate a constant electric field.

11. The fluid-application device of claim 9, further comprising a controller to apply an alternating current to the electrowetting mechanism, such that the electrowetting mechanism is to generate a varying electric field.

12. The fluid-application device of claim 9, further comprising a platen of which the electrowetting mechanism is a part, wherein the electrowetting mechanism is to generate the electric field between the platen and the fluid-application mechanism.

13. The fluid-application device of claim 9, wherein the electrowetting mechanism is to generate the electric field at least partially parallel to a swath of the media.

14. The fluid-application device of claim 9, wherein the fluid-application mechanism is to apply one or more of electrically non-conductive fluid and electrically conductive fluid onto the media.

15. A method comprising:

applying fluid onto media, by a fluid-application mechanism of a fluid-application device; and, affecting the fluid applied onto the media, by an electrowetting mechanism of the fluid-application device generating an electric field, wherein affecting the fluid comprises:

improving thickness uniformity and optical flatness of the fluid applied onto the media as the fluid dries on the media.

16. The method of claim 15, wherein affecting the fluid further comprises one or more of:

increasing a resolution of an image formed by the fluid applied onto the media by moving drops of the fluid applied onto the media;

decreasing error in placement of the drops of the fluid applied onto the media by moving the drops of the fluid applied onto the media.

17. The method of claim 15, wherein affecting the fluid further comprises one or more of:

overcoating the media with the fluid applied onto the media by smearing a drop of the fluid applied onto the media;

decreasing a density of the fluid applied onto the media by smearing the drop of the fluid applied onto the media.

18. The method of claim 15, wherein affecting the fluid further comprises one or more of:

texturing the media with the fluid applied onto the media by moving drops of the fluid applied onto the media onto one another;

sequestering the drops of the fluid applied onto the media by inhibiting movement of the drops of the fluid applied onto the media.

* * * * *